US005552695A

United States Patent [19]
Schwartz

[11] Patent Number: 5,552,695
[45] Date of Patent: Sep. 3, 1996

[54] SYNCHRONOUSLY RECTIFIED BUCK-FLYBACK DC TO DC POWER CONVERTER

[75] Inventor: Peter H. Schwartz, Palo Alto, Calif.

[73] Assignee: Linear Technology Corporation, Milpitas, Calif.

[21] Appl. No.: 215,898

[22] Filed: Mar. 22, 1994

[51] Int. Cl.⁶ ........................................................ G05F 1/40
[52] U.S. Cl. ............................ 323/271; 323/272; 363/101
[58] Field of Search ........................................ 323/266, 267, 323/271, 272, 282, 285, 259, 901, 344, 351; 363/101, 124

[56] References Cited

U.S. PATENT DOCUMENTS 5,119,013  6/1992  Sabroff ........................................ 323/267
5,336,985  8/1994  McKenzie .................................. 323/266

OTHER PUBLICATIONS

"New Constant Frequency PWM Dual Convertor with Synchronous Rectifier," *Electronics Letters*, Vol. 29, No. 24, by H. H. Seong and G. H. Chopp, The Institution of Electrical Engineers, United Kingdom, Nov. 25, 1993, pp. 2074–2076.
"LT1070 Design Manual," *Linear Technology Application Note 19*, by C. Nelson, Linear Technology Corporation, Milpitas, California, Jun. 1986, pp. 1–76.
"LT1074/LT1076 Design Manual," *Linear Technology Application Note 44*, by C. Nelson, Linear Technology Corporation, Milpitas, California, Sep. 1991, pp. 1–48.
"Power Conversion from Milliamps to Amps at Ultra–High Efficiency (Up to 95%)," *Linear Technology Application Note 54*, by B. Huffman and R. Flatness, Linear Technology Corporation, Milpitas, California, Mar. 1993, pp. 1–24.
"Linear Technology LTC1148: LTC1148–3.3/LTC1148–5: High Efficiency Synchronous Step–Down Switching Regulators," *Linear Technology Data Sheet*, Linear Technology Corporation, Milpitas, California, Mar. 1994, pp. 1–20.
"Linear Technology LTC1149: LTC1149–3.3/LTC1149–5: High Efficiency Synchronous Step–Down Switching Regulators," *Linear Technology Data Sheet*, Linear Technology Corporation, Milpitas, California, May 1993, pp. 1–20.
"Linear Technology LT1432: 5V High Efficiency Step–Down Switching Regulator Controller," *Linear Technology Data Sheet*, Linear Technology Corporation, Milpitas, California, Mar. 1992, pp. 1–28.
"Low parts Count DC/DC Converter Circuit With 3.3V and 5V Outputs," by R. Vinsant, *Linear Technology Design Note 69*, Linear Technology Corporation, Militas, California, Apr. 1993.
"Single LTC1149 Delivers 3.3V and 5V at 17W," by P. Schwartz, *Linear Technology Design Note 72*, Linear Technology Corporation, Militas, California, Jul. 1993.
"Single LTC1149 Provides 3.3V and 5V in Surface Mount," by P. Schwartz, *Linear Technology Design Note 77*, Linear Technology Corporation, Militas, California, Dec. 1993.
"Linear Technology Demo Manual DC027A: Dual Output DC/DC Converter,"*Linear Technology Demo Manual*, Linear Technology Corporation, Milpitas, California, Dec. 1993, pp. 1–8.

*Primary Examiner*—Peter S. Wong
*Assistant Examiner*—Shawn Riley
*Attorney, Agent, or Firm*—Fish & Neave; Robert W. Morris; Gabrielle E. Higgins

[57] ABSTRACT

A synchronously rectified buck-flyback converter is described which provides multiple synchronous regulated outputs. A synchronous buck converter provides the main output and a synchronous flyback converter, utilizing the primary inductor of the buck converter, provides the secondary output. The converter utilizes a split-feedback signal, whereby each of the regulated outputs provides a component of the signal and a switch controller synchronously activates and deactivates rectification switches based on the feedback signal, required output levels and load. The switches are synchronously controlled such that a power input switch is operated in anti-phase to a control switch for each regulated output.

62 Claims, 5 Drawing Sheets

SYNCHRONOUSLY RECTIFIED BUCK-FLYBACK DC TO DC POWER CONVERTER

BACKGROUND OF THE INVENTION

This invention is concerned with direct-current to direct-current (DC-DC) power converters. More particularly, it is concerned with providing voltage regulation circuitry to two or more outputs using a single feedback or control loop. This circuitry is combined with a buck-flyback converter using synchronous rectification techniques to provide highly efficient power conversion and regulation functions.

There are increasing demands for power conversion circuits to operate with ever increasing efficiency due to the proliferation of portable electronic devices. In most instances, these devices are intended to be primarily driven by battery power and it is highly desirous for the battery to last as long as possible. As such, the operational voltages for various electronic devices (such as microprocessors and memory) continue to be driven to lower and lower levels to extend battery life. The prior 5 volt "standard" has been replaced by a 3.3 volt standard, and this may soon be replaced by an even lower 2.7 volt standard. As the regulated voltage level drops, the difficulty in providing an efficiently regulated output voltage in an efficient manner increases, due in part to the increasingly significant effects of the voltage drops across traditional components (e.g., the 0.4 to 0.7 voltage drop across a diode).

Voltage regulators have been implemented using various techniques. In a switching regulator, the flow of power to a load is regulated by controlling the on and off duty-cycle of one or more power switches coupled to the load (the switches may be coupled in series or in parallel).

Switching regulators are typically classified into different configurations or "topologies." One topology—the single-ended inductor circuit—consists of relatively simple circuits where a switch determines whether the voltage applied to an inductor is $V_{IN}$ or zero. In this manner, the output voltage is a function of the average voltage applied to the inductor.

The output voltage varies depending on the configuration of individual components and the class of single-ended inductor circuit. For example, placing the switch in series between the input and the output causes the output voltage to be less than the input voltage. Such a circuit is commonly referred to as a "step-down" or "buck" converter. By placing the switch in parallel with the output, the output voltage can be made to be greater than the input voltage. Such a circuit is commonly referred to as a "step-up" or "boost" converter. Buck and boost circuits may also be combined—as a "buck-boost" regulator—to provide an inverted-polarity output. One disadvantage of these circuits is that they are limited to a single regulated output. When multiple outputs are required, multiple regulators are used which require multiple feedback or control loops for proper operation, thereby increasing part count, complexity and cost.

Another regulator topology is the transformer-coupled switching regulator. This topology provides an increased ability to achieve current or voltage gain, as well as the possibility of isolation between input and output provided by the transformer. As was the case with single-ended inductor regulators, transformer-coupled regulators are also grouped into classes. So-called "flyback converters" use a transformer to transfer energy from input to output. By adjusting the turns ratio (N) between the primary and secondary of the transformer, the regulator may be caused to provide output voltages which are higher or lower than the input voltage. One disadvantage of flyback converters is the high energy which must be stored in the transformer for proper operation. This requires relatively large magnetic cores and may reduce overall circuit efficiency.

The "forward converter" is another class of transformer-coupled regulator. In the forward converter, an additional winding is provided along with other components, such as diodes and capacitors, which essentially eliminates the problem of large stored energy in the transformer core. The additional (or reset) winding normally has a 1:1 turns ratio to the primary winding to help define the switch voltage when the primary switch is turned off. Unfortunately, the turns ratio may limit the duty-cycle of the device to 50% maximum, above which the switch current will typically rise in an uncontrolled manner. If the number of turns on the reset winding is reduced to increase duty-cycle, there is typically a corresponding increase in the level of switch voltage.

It is also possible to provide other combined configurations, such as a "buck-flyback hybrid" converter, in order to attempt to utilize the best properties of different topologies. Previously known buck-flyback converters provide multiple regulated outputs by generating a main output (e.g., 3.3 volts) using a buck converter and adding an auxiliary winding which operates as a flyback converter for a secondary output (e.g., 5 volts). One disadvantage of these converters is the fact that the output power of the auxiliary winding is limited by the output power of the main output. Additionally, when the auxiliary output is heavily loaded, the buck inductor will observe increased output voltage ripple due to the transformer effects of the auxiliary winding. These, as well as other, disadvantages severely limit the input and output operational ranges of these devices. Also, the flyback action of this converter may result in a severely reduced overall efficiency.

One method that has been utilized heretofore to achieve increased operational efficiency of voltage regulators employs synchronous rectification. In synchronous rectification, a pair of switches, which are connected in series between the input voltage and ground, are synchronized so that either the input voltage or ground is applied to the input of the inductor. The synchronous control of the switches provides a great improvement in efficiency as compared to the traditional circuits which employed a switch and a diode. One disadvantage of these synchronous circuits, however, is the fact that they are unitary in nature—one feedback/control loop is needed for each regulated output. Therefore, a regulator supplying 5 volt and 3.3 volt outputs requires two control loops.

In view of the foregoing, it would be desirable to provide a voltage regulator having multiple regulated outputs, at user selectable voltage levels, using a single control loop.

It would also be desirable to provide a voltage regulator having multiple regulated outputs which operates over a broad range of input voltages and output power requirements.

It would be additionally desireable to provide a voltage regulator having multiple outputs which can provide full power to any one regulated output regardless of the loading on the other outputs.

SUMMARY OF THE INVENTION

It is an object of the present invention to provide a voltage regulator having multiple regulated outputs, at user selectable voltage levels, using a single control loop.

It is another object of the present invention to provide a voltage regulator having multiple regulated outputs which operates over a broad range of input voltages and output power requirements.

It still another object of the present invention to provide a voltage regulator having multiple outputs which can provide full power to any one regulated output regardless of the loading on the other outputs.

In accordance with these and other objects of the present invention, a switching voltage regulator having multiple synchronously regulated outputs is described. The voltage regulator utilizes synchronous rectification techniques to provide improved efficiency over traditional regulators while providing good cross-regulation between the outputs. A buck (step-down) converter provides the main output while an auxiliary flyback (step-up) arrangement provides one or more additional regulated outputs. Each of the outputs has a switch which is synchronized to operate in a state opposite that of the input voltage switch. Each of the output signals provides a component of a feedback signal which is fed back to a controller to determine the sequencing of the switches to maintain high efficiency and cross-regulation. The different outputs may be electrically coupled together via inductive elements, or the output circuits may be essentially independent with the only link between them being magnetic coupling and a single switch command signal. Also described are various alternative regulator embodiments in which other secondary functions (e.g., soft-start, overcurrent protection, undervoltage lockout, etc.) are provided.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

BACKGROUND

FIGS. 1A–1D show various known topologies with which to implement basic switching voltage regulators. A typical example of a conventional buck regulator, which provides output voltages at less than the input voltage, is shown in simplified schematic form in FIG. 1A. Buck converter 10 includes switch 12 (S1), diode 14 (D1), inductor 16 (L1) and capacitor 18 (C1). In the buck converter configuration, switch 12 is typically coupled between an input node $V_{IN}$ and one end of inductor 16. The other end of inductor 16 is coupled to an output node $V_{OUT}$. Diode 14 is coupled between ground and a node formed between switch 12 and inductor 16, while capacitor 18 is coupled between $V_{OUT}$ and ground.

Figure 1A:
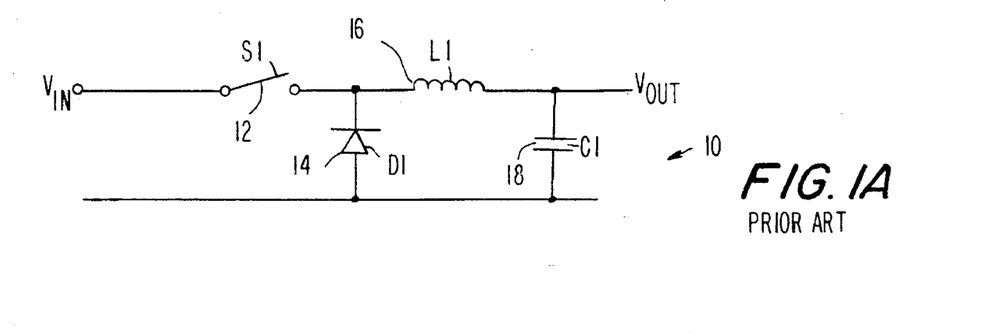
FIGS. 1A–1F are simplified schematic diagrams of prior art switching voltage regulators.

The output voltage is the average voltage applied to inductor 16 through switch 12. When switch 12 is closed, diode 14 is reverse biased, and when switch 12 is open, diode 14 will become forward biased. The sequence of open and close actions by switch 12 regulates the voltage such that the longer switch 12 is closed, the higher the regulated voltage (because a higher average current flows through inductor 16). Thus, the duty-cycle of the switch (i.e., the ratio of the time switch 12 is closed to the total time) is an important factor in determining the output voltage of the regulator.

Figure 1B:
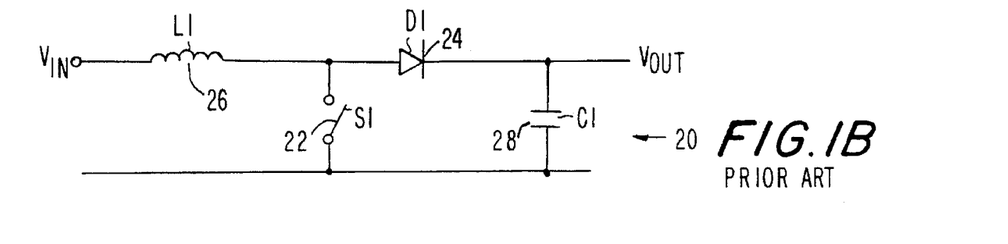

FIG. 1B shows a typical example of a known conventional boost switching regulator, which provides output voltages greater than the input voltage. Boost regulator 20 includes switch 22 (S1), diode 24 (D1), inductor 26 (L1) and capacitor 28 (C1). In the boost regulator configuration, inductor 26 is typically coupled between an input node $V_{IN}$ and the anode of diode 24. The cathode of diode 24 is coupled to an output node $V_{OUT}$. Switch 22 is coupled between ground and a node formed between inductor 26 and diode 24, while capacitor 28 is coupled between $V_{OUT}$ and ground.

The output voltage of boost regulator 20 is regulated above the input voltage as follows. When switch 22 is closed, diode 24 is reverse biased and inductor 26 charges. When switch 22 is open, diode 24 is forward biased and inductor 26 discharges. If switch 22 remained open permanently, $V_{OUT}$ would equal $V_{IN}$ because inductor 26 would be fully discharged, acting only as a DC short circuit. Therefore, until inductor 26 is fully discharged, it contributes energy, over and above the energy from $V_{IN}$, to the output. Once again, the duty-cycle of the switch (which in this case, controls the amount of charge stored on inductor 26) is important in determining the output voltage of the regulator.

Figure 1C:
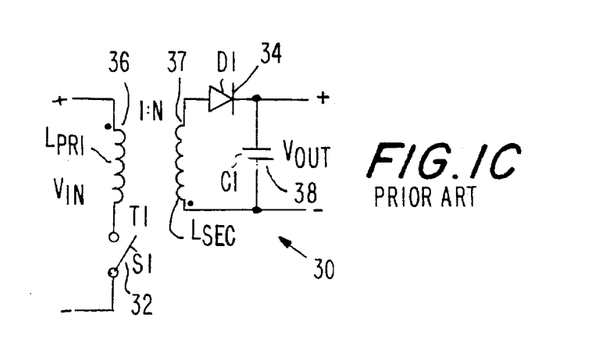

FIG. 1C shows an example of a known flyback regulator topology. Flyback regulator 30 includes many of the same components (switch S1, diode D1 and capacitor C1) as buck converter 10 and boost regulator 20. One difference between the previously discussed topologies and the flyback regulator is that the inductor of the buck and boost circuits is replaced by a transformer T1 in the flyback circuit. The transformer is formed from a primary winding 36 ($L_{PRI}$), having one end coupled to the positive terminal $V_{IN}$ and the other end coupled through switch 32 (S1) to negative terminal $V_{IN}$, and a secondary winding 37 ($L_{SEC}$), having one end coupled to negative terminal $V_{OUT}$ and the other end coupled to the anode of diode 34 (D1). The cathode of diode 34 is coupled to the positive terminal of $V_{OUT}$ and to one end of capacitor 38, while the other end of capacitor 38 is coupled to the negative terminal of $V_{OUT}$.

The turns ratio between $L_{PRI}$ and $L_{SEC}$, commonly expressed as 1:N (where N is the number of winding turns in the secondary for each winding turn in the primary) may be adjusted for optimum power transfer between the input and output. By varying the turns ratio and the duty-cycle of the switch, the flyback regulator is capable of providing output voltage which is higher or lower than the input voltage. This provides more flexibility when compared to the buck and boost circuits, but does so at the disadvantage of requiring high energy storage in the transformer core and, therefore, lower operational efficiency.

Figure 1D:
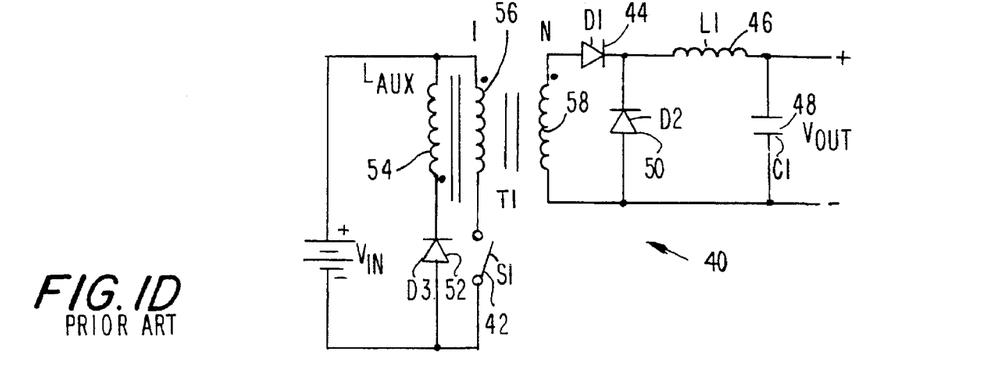

A circuit which avoids the problem of large energy storage in the transformer core is shown by conventional forward converter 40 in FIG. 1D. Transformer T1 of forward converter 40 is formed from: (1) primary winding 56 ($L_{PRI}$), which is coupled to positive terminal $V_{IN}$ and through switch 42 (S1) also coupled to negative terminal $V_{IN}$, and (2) secondary winding 58 ($L_{SEC}$). Also coupled across the terminals of $V_{IN}$ is an auxiliary winding 54 ($L_{AUX}$) of transformer T1 in series with diode 52 (D3) (the anode of diode 52 is coupled to the negative terminal of $V_{IN}$). Secondary winding 58 has one end coupled to the negative terminal of $V_{OUT}$ and the other end coupled to the anode of diode 44 (D1). The cathode of diode 44 is coupled to the positive terminal of $V_{OUT}$ via a series connection through filter inductor 46 (L1). The anode of an additional diode 50 (D2) is coupled to the negative terminal of $V_{OUT}$, while the cathode of diode 50 is coupled to a node between diode 44 and inductor 46. As in all of the previous circuits, a capacitor 48 (C1) is coupled across the output terminals.

In the forward converter of FIG. 1D, power is transferred from the input to the load through diode 44 when switch 42 is closed. When switch 42 is open, diode 44 is reverse biased and current flows from inductor 46 through diode 50. The output voltage varies in relation to the duty-cycle of switch 42 and also in relation to the number of turns in secondary winding 58. The auxiliary winding $L_{AUX}$ and diode 52 act to clamp the switch voltage and to hold the magnetic flux in the transformer core at a zero average level when switch 42 is opened. Winding $L_{AUX}$ typically has a 1:1 turns ratio with respect to primary winding $L_{PRI}$, which limits the duty-cycle to 50% maximum. If the number of turns in $L_{AUX}$ is reduced, the duty-cycle may exceed 50%, but this also results in a higher switch voltage. The forward converter provides lower output ripple than flyback converters, but also suffers from increased input ripple current (due to the lower duty-cycle).

Figure 1E:
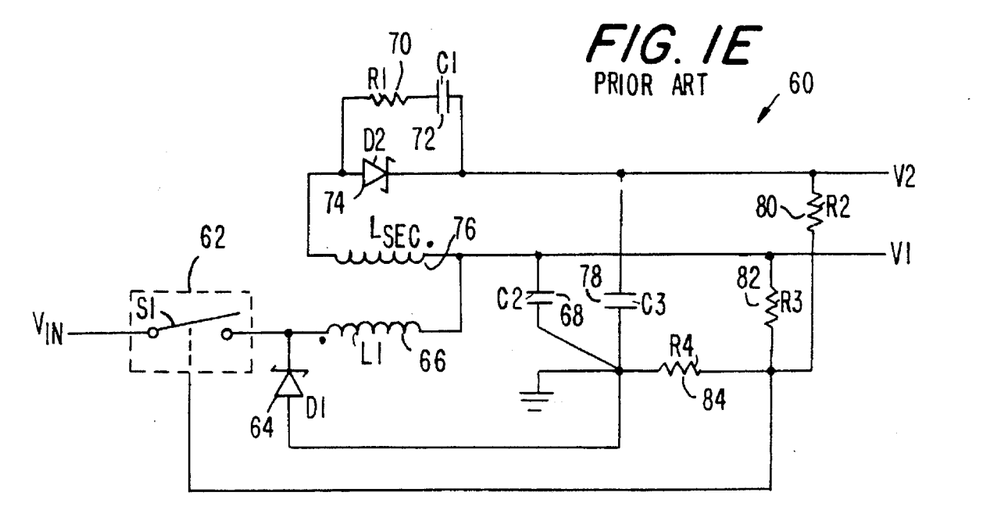

A previously known multiple output switching regulator is shown by buck-flyback converter 60 in FIG. 1E. This regulator combines some of the advantages of the buck converter with the flyback regulator, whereby each component provides one regulated output (i.e., the buck circuit elements provide one regulated output and the flyback elements provide another regulated output). The buck elements are configured in the same manner as the circuit components of buck converter 10, where switch 62 (S1) is coupled in series to inductor 66 (L1) between $V_{IN}$ and output V1 (switch 62 is coupled to $V_{IN}$ and inductor 66 is coupled to V1); diode 64 (which, preferably, is a Schottky diode) is coupled between ground and a node between switch 62 and inductor 66, and capacitor 68 (C2) is coupled between V1 and ground.

The flyback elements include a secondary winding 76 ($L_{SEC}$), which interacts with inductor 66, coupled in series to a diode 74 (also, preferably, a Schottky diode) which is coupled to output V2. The series combination of a resistor 70 (R1) and a capacitor 72 (C2) is coupled in parallel across diode 74. Also, an output capacitor 78 (C3) is coupled between V2 and ground. Output sensing resistors 80 and 82 (R2 and R3), which are coupled across outputs V2 and V1, respectively, interact with resistor 84 (R4) to provide a feedback signal that is used in determining when to open and close switch 62. Although the hybrid circuit of FIG. 1E provides multiple outputs from a single input, its topology has inherent deficiencies which appear at low output voltages (such as the inefficient output of the flyback component and the difficulty of achieving low level output signals due to the voltage drops across the diodes). Additionally, the flyback component has limited input and output ranges over which it can effectively provide a regulated second output while restricting the circuit to a relatively low efficiency. The circuit may also experience cross-regulation problems from variations in the output loads.

Figure 1F:
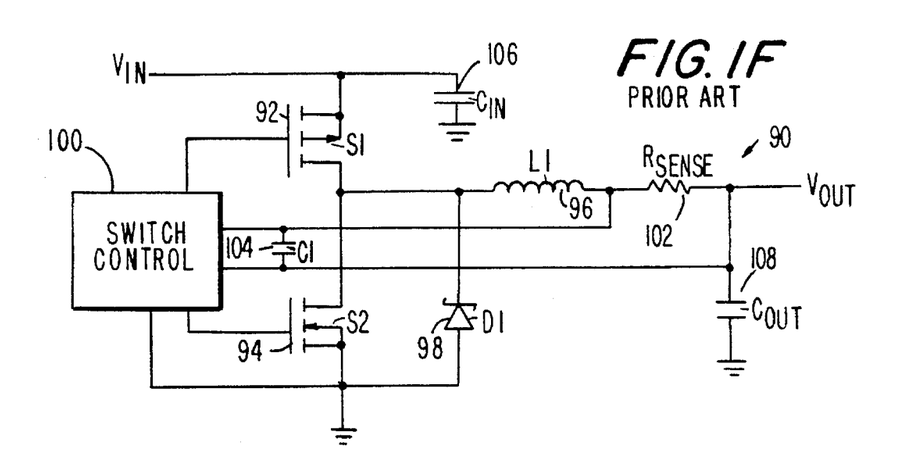

One technique known to improve the overall energy efficiency for a given range of input and output voltages is synchronous rectification. FIG. 1F shows a conventional synchronous buck converter 90 which has been modified to include synchronous rectification. Buck converter 90 includes the traditional coupling from $V_{IN}$ through transistor switch 92 (S1) and inductor 96 (L1) to $V_{OUT}$. Synchronous rectification is added to the circuit by a second transistor switch 94 (S2), which is coupled between ground and a node between switch 92 and inductor 96, and a switch control 100 that operates switches 92 and 94 in anti-phase (by "anti-phase" it is meant that only one of the switches is on at the same time). Switches 92 and 94 are preferably power MOSFETs (to handle the necessary currents and to eliminate any intrinsic ON state voltage drops). The switches are operated by switch control 100 so that one end of inductor 96 is either at $V_{IN}$ or at ground. This operation substantially eliminates the voltage drop which occurs in previously described buck and boost circuits from diode 98.

The synchronous buck converter of FIG. 1F also includes: a schottky diode 98 (D1) coupled between ground and the node between switches 92 and 94 to prevent turn-on of the intrinsic drain-body diode of switch 94, a resistor 102 ($R_{SENSE}$) coupled in series between inductor 96 and $V_{OUT}$ for providing a feedback signal to switch controller 100, a capacitor 104 (C1) for differential decoupling between the leads connected to $R_{SENSE}$, an input capacitor 106 ($C_{IN}$) coupled to $V_{IN}$ to prevent large voltage transients and to provide an AC ripple current path (and for high frequency decoupling, if necessary), and an output capacitor 108 ($C_{OUT}$) coupled to $V_{OUT}$.

In a typical synchronous regulator application, switch control 100 monitors the output voltage at the end of $R_{SENSE}$ which is coupled to $C_{OUT}$ and compares it to a reference voltage (e.g., 1.25 volts). Switch control 100 synchronously controls switches 92 and 94 in anti-phase to regulate the output as a function of the desired output voltage and the monitored load current. Although these regulators achieve relatively high power conversion efficiencies, they only provide a single regulated output. Providing multiple synchronously regulated outputs previously required one feedback/control loop for each output—a separate sense line and comparator circuit.

DETAILED DESCRIPTION OF THE INVENTION

An improved switching regulator having multiple outputs is provided in which the rectifying switches are synchronously controlled. In a preferred embodiment of the present invention, the duty-cycle of a first switch is controlled in anti-phase to a pair of second and third switches. These switches are used to regulate first and second output voltages. A main output of the regulator is determined using a buck converter while an additional output is provided by coupling a secondary winding to the buck inductor, in a flyback configuration. The first switch regulates the flow of current from the input to the buck inductor coil. The second and third switches, operate in phase with one another, and alternately from (in anti-phase to) the first switch to discharge the inductor coils.

Figure 2:
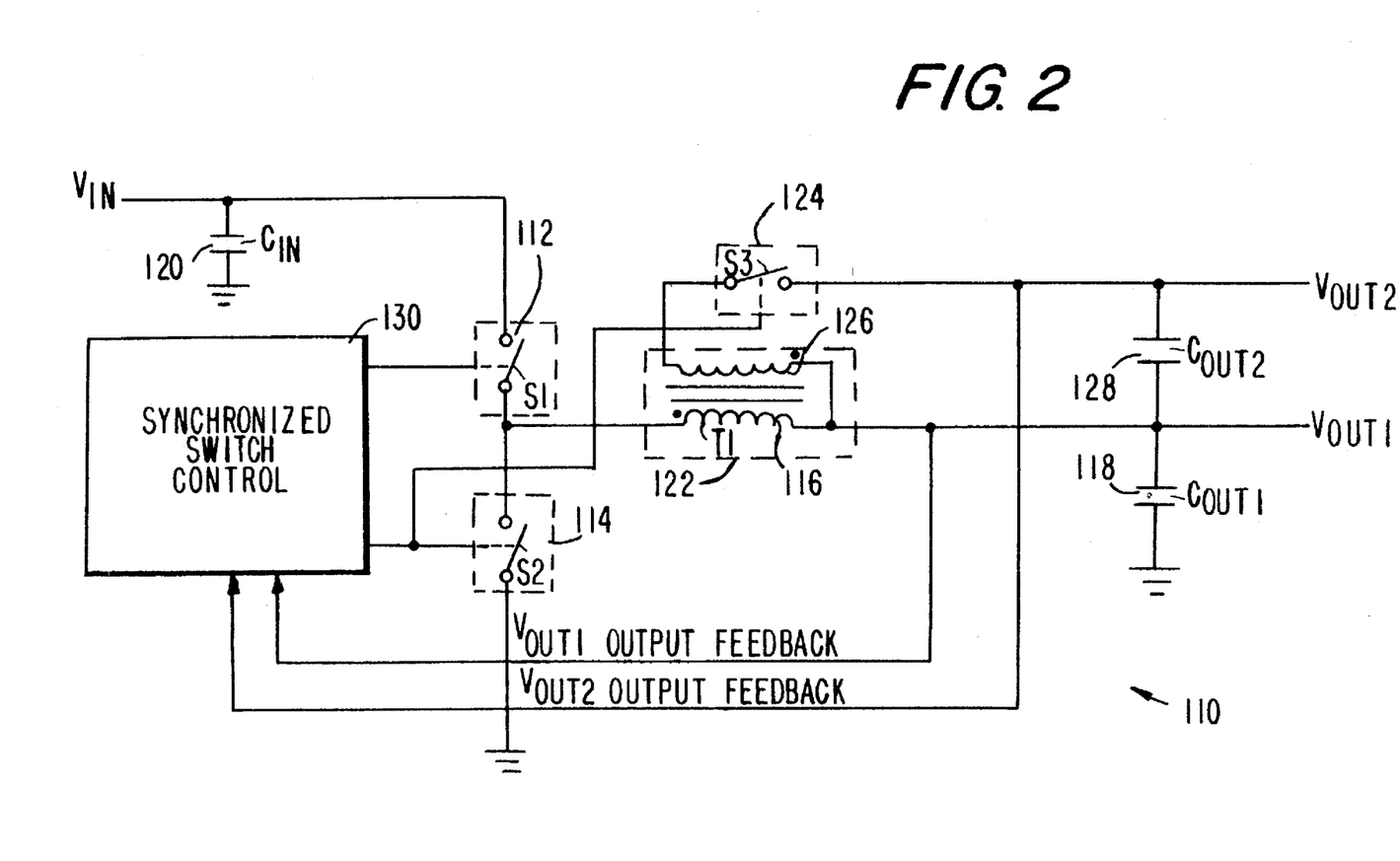
FIG. 2 is a block schematic diagram of an embodiment a multiple output buck-flyback switching voltage regulator in which synchronous switching is provided for each output in accordance with principles of the present invention.

A multiple output switching regulator incorporating principles of the present invention is shown in FIG. 2. Any one of the multiple regulated outputs of the circuit of FIG. 2 can be fully loaded essentially without regard to the loading of the other outputs (up to the circuit's total output power limits). This capability also enables the circuit to operate without any minimum loading requirements on any of the outputs.

Synchronous switch regulator 110 includes first switch 112 (S1), coupled between input $V_{IN}$ and a terminal of the primary transformer winding 116. The other end of primary winding 116 is coupled to output $V_{OUT1}$. A second switch 114 (S2) is coupled between ground (it should be apparent that other predetermined reference potentials, such as $-V_{IN}$ may be used instead of ground) and a node between switch 112 and primary winding 116. An input capacitor 120 ($C_{IN}$) is coupled to $V_{IN}$ and a first output capacitor 118 ($C_{OUT1}$) is coupled to $V_{OUT1}$. Secondary transformer winding 126 is wound on the same core as primary winding 116 to form transformer 122 (T1). Secondary winding 126 is coupled through a third switch 124 (S3) to a second output $V_{OUT2}$. A second output capacitor 128 ($C_{OUT2}$) is preferably coupled between $V_{OUT1}$ and $V_{OUT2}$. (Although capacitor $C_{OUT2}$ is not required to be connected to $V_{OUT1}$, the circuit generally will be more efficient with both output capacitors in the stacked configuration as shown.) All three switches 112, 114 and 124 are coupled to and controlled by switch control 130 such that switches 114 and 124 are operated together in phase, and in anti-phase to switch 112.

Synchronous switching regulator 110 includes a buck component (including circuit devices 112, 114, 116, 118 and 130) and a flyback component (including circuit devices 112, 124, 126, 128 and 130). Switch control 130 is powered by $V_{IN}$ with a positive input voltage. It should be readily apparent, however, that through the use of a separate power input to switch control 130, the input and output voltages of the regulator may be completely independent of each other, both in magnitude and sign (see, e.g., FIG. 4). For example, a negative $V_{IN}$ may be used to regulate two positive outputs or one positive output and one negative output.

Switching regulator 110 operates by having switch control 130 send commands to turn on (close) switch S1 and, correspondingly, to turn off (open) switches S2 and S3. The on and off duty-cycles of the switches is varied by control 130 as required in order to regulate the output voltages. When this switching occurs, the voltage at the node between switches S1 and S2 is greater than $V_{OUT1}$ and current flows into primary winding 116 of T1, thereby increasing the energy stored in the primary winding. Simultaneously, the current passing through the primary winding charges capacitor $C_{OUT1}$. After a given time interval, based on the required output voltage and loading (unless $V_{OUT1}$ equals $V_{IN}$, in which case switch S1 remains on), switch S1 is turned off (opened) and switches S2 and S3 are turned on (closed), thereby stopping the increase in the flow of current into the primary winding.

The cessation of increasing current causes the primary of transformer T1 to reverse its voltage polarity. Switch S2 couples one end of primary winding 116 to ground, and therefore to the grounded side of capacitor $C_{OUT1}$. This provides a circuit path for the primary winding to discharge its stored energy. After another given time interval, switch control 130 reverses switches S1, S2 and S3 and the cycle begins again. If switch S2 remains closed for enough time, the primary winding may fully discharge in one direction and begin charging in the opposite direction (through the path from $V_{OUT1}$, capacitor $C_{OUT1}$, and switch S2). This enables capacitor $C_{OUT1}$ to act as an "energy reservoir" providing energy to the flyback component when the flyback output is heavily loaded and the buck output is not.

The above sequence of events affects the secondary winding of transformer T1. When switch S1 is open, the voltage across the primary is fixed at $-V_{OUT1}$ (because $C_{OUT1}$ holds one side of the primary at $V_{OUT1}$ and switch S2 holds the other side at ground). The opening of switch S1 causes a voltage to appear across the secondary (the magnitude of this voltage being equal to the turns ratio times $V_{OUT1}$). Switch S3, which is closed while switch S1 is open, permits the secondary voltage to charge capacitor $C_{OUT2}$ (to a voltage determined by the turns ratio and $V_{OUT1}$). The current path from the secondary, through switch S3 and capacitor $C_{OUT2}$ forms a synchronously rectified flyback converter, where a known voltage is periodically developed across the secondary so that the secondary current climbs from zero to a given level.

Capacitor $C_{OUT2}$ averages the resulting current pulses and filters out high frequency energy to reduce ripple at output $V_{OUT2}$. Although the current flowing through the secondary and capacitor $C_{OUT2}$ must ultimately return to the secondary, capacitor $C_{OUT2}$ need not be connected to $V_{OUT1}$ as shown. For example, capacitor $C_{OUT2}$ may be coupled to ground instead of to $V_{OUT1}$ and the current would return through $C_{OUT1}$ to the secondary. The use of synchronous rectification on the secondary output increases the efficiency of the flyback converter by eliminating the voltage drop associated with conventional diode rectifiers. A further advantage of this configuration is evident when only the flyback output is heavily loaded. In such a configuration, capacitor $C_{OUT1}$ may act as an energy reservoir and source energy into the secondary. This energy is restored to $C_{OUT1}$ during the next cycle closing switch S1. Additionally, feedback of the output signals may be provided to control 130 by separate feedback lines (as shown in FIG. 2), or a combined feedback signal (as shown and described with respect to FIG. 3 below).

Figure 3:
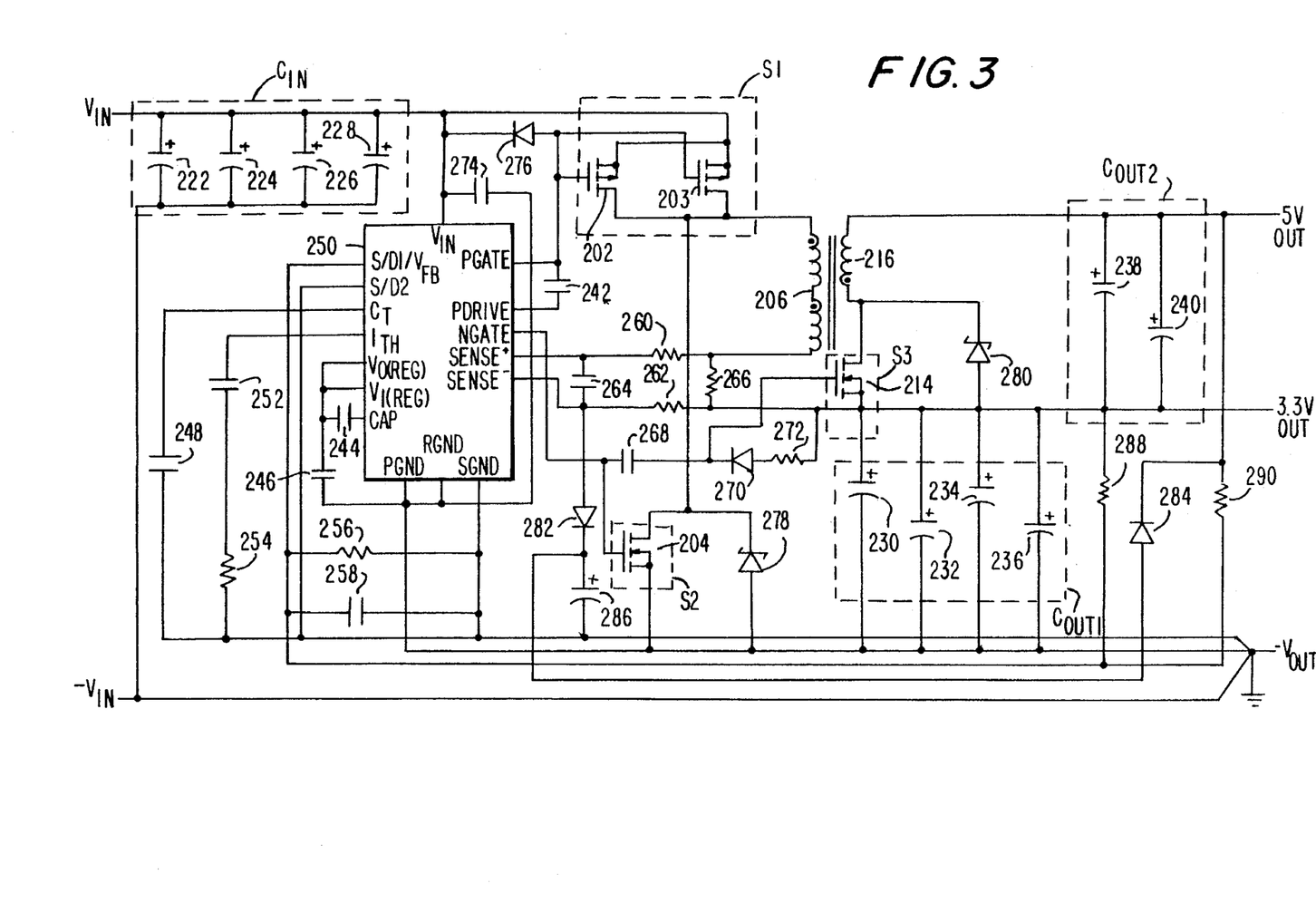
FIG. 3 is a block schematic diagram of an embodiment of the present invention showing a multiple output buck-flyback synchronous switching voltage regulator.

A detailed circuit diagram of a circuit embodying the present invention, in which a combined feedback signal is used, is shown in FIG. 3. In switching regulator 200, switch S1 is formed by a pair of parallel-connected p-channel power MOSFETs 202 and 203. Depending on the current load requirements, it may also be possible to utilize a single power MOSFET for switch S1. Switches S2 and S3 are also shown as n-channel power MOSFETs 204 and 214, respectively. Although switches S1, S2 and S3 are shown using a mixture of n-channel and p-channel MOSFETs, other configurations of switches are possible. For example, the switches could be all either n-channel or p-channel MOSFETs, or NPN/PNP bi-polar transistors. Input capacitor $C_{IN}$ is shown as four parallel capacitors 222, 224, 226 and 228, which provide improved space and reliability considerations over a single capacitor. Output capacitors $C_{OUT1}$ and $C_{OUT2}$ are also shown as multiple parallel capacitors ($C_{OUT1}$ includes capacitors 230, 232, 234 and 236, and $C_{OUT2}$ includes capacitors 238 and 240).

For the embodiment of FIG. 3, which is especially intended to produce 3.3 volts and 5.0 volts, transformer T1 is preferably a trifilar-wound transformer (where three wires are simultaneously wound on the same magnetic core). Primary winding 206 is formed from a series connection between two of the trifilar windings, and secondary winding 216 is the remaining winding. The trifilar winding process results in excellent magnetic coupling which improves cross-regulation and efficiency. The trifilar winding inherently provides a 2:1 turns ratio (because the two series connected windings are wound the same length in the same manner as the single, secondary winding), thereby providing outputs at 3.3 volts and 5 volts (nominal) as follows (assuming $V_{OUT1}$ equals 3.3 volts):

$$V_{OUT2} = N \text{ (turns ratio)} \times V_{OUT1} + V_{OUT1}$$

$$V_{OUT2} = 0.5 \times 3.3 \text{ volts} + 3.3 \text{ volts} = 4.95 \text{ volts}$$

It should also be noted that the magnetics of the circuit need to be able to withstand high peak currents without saturating. Although a trifilar winding is preferred, the circuit of the present invention may also be accomplished with non-multifilar wound transformers. Additional considerations must be made for the magnetic core, because once the magnetic core saturates, there will be a significant loss of inductance in the primary winding—a very undesirable condition. Therefore, it is preferable to form the magnetic core with a material such as ferrite, molypermalloy or Kool Mμ (a registered trademark of Magnetics, Inc.), or gapped ferrite. Powdered iron core material typically provides acceptable saturation characteristics, but will generally degrade circuit efficiency due to its AC loss characteristics.

Control of switches 202, 203, 204 and 214 of regulator 200 is accomplished by switch control 250. Switch control 250 preferably is a high efficiency synchronous switching regulator which varies duty-cycle. Switch control 250 preferably comprises an LTC 1149 high efficiency synchronous switching regulator, available from Linear Technology Corp. of Milpitas, California. Detailed technical information concerning the LTC 1149 may be found in "LTC 1149/LTC 1149-3.3/LTC 1149-5," Data Sheet, pp. 1–20, published by Linear Technology Corp., Milpitas, Calif., 1993, which is incorporated herein by reference.

The circuit of FIG. 3 generally operates as follows. The switch control establishes a duty-cycle for the switches that regulates the outputs. The duty-cycle is based, at least in part, on a feedback signal which is input to pin $\text{S/D1/V}_{FB}$ (the feedback signal is derived from both of the regulated outputs). The feedback signal is used by the switch control to set an internal threshold. Pins SENSE+ and SENSE– sense the voltage across an external resistor (this voltage being proportional to the current through the resistor, and thus indicative of that current). This voltage is compared to the internal threshold. When the threshold is exceeded, the switch control triggers the switches to change state. The remainder of an individual cycle is determined by the discharge of a timing capacitor connected to pin $C_T$ (when $C_T$ is discharged, switch control triggers the switches to return to their prior states and a new cycle begins). The switch control accounts for variations in the input signal or output loading by varying the internal threshold.

More specifically, in the circuit of FIG. 3, a capacitor 242 is used to bootstrap the PGATE pin of control 250 to $V_{IN}$, while diode 276 clamps PGATE to $V_{IN}$ plus the voltage drop across the diode. Capacitor 244 is coupled between the charge compensation pin (CAP) and the $V_{I(REG)}$ pin (both of control 250) to provide a charge to capacitor 242 during power supply transitions. Additionally, capacitor 246 closely decouples pin $V_{I(REG)}$ to power ground (pin PGND), while capacitor 248 is used to set the operating frequency of switch control 250. Capacitor 252 and resistor 254, which are coupled in series between pin $I_{TH}$ and ground, serve primarily to provide control loop frequency compensation for switch control 250 (and thereby for the converter overall).

Capacitor 258 provides noise rejection for the feedback pin ($\text{S/D1/V}_{FB}$). Resistors 260 and 262 and capacitor 264 decouple the sense pins (SENSE+ and SENSE–) of control 250 from each other, while resistor 266 is used to sense current for the comparator internal to control 250. The series coupling of capacitor 268, diode 270 and resistor 272 provide AC level shifting for switch 214. Capacitor 274 provides high frequency decoupling for pin $V_{IN}$. Diodes 278 and 280 prevent the intrinsic drain-body diodes of switches 204 and 214, respectively, from turning on when all of the switches are commanded OFF (to prevent efficiency losses).

Switching regulator 200 provides cross-regulation between the buck output (3.3 V) and the flyback output (5 V) by splitting a feedback signal between the outputs through resistors 288 and 290, respectively. This signal is applied to control 250 (through pin $\text{SD1V}_{FB}$) such that the voltage drop across resistor 256 is essentially 1.25 volts (the reference voltage). In this manner, although only a single combined feedback signal is used, each output makes a contribution to that signal. The split feedback does introduce potential start-up difficulties, such as the possibility of overshoot, but those difficulties can be resolved as described below. Additionally, the high efficiency regulator may include circuitry to shut off all switches when the output load falls below a predetermined level, thereby further conserving power and increasing efficiency.

Switching regulator 200 includes a soft-start circuit, including diodes 282 and 284, capacitor 286 and resistor 262, which protects the electronic devices during initial start-up. Without the soft-start circuit, regulator 200 upon start-up would immediately go to 100% duty-cycle (switch S1 would remain open constantly) because the output capacitors have not been adequately charged and the flyback output has not been generated (the flyback output cannot be generated until switch S1 opens and switch S3 closes). This event could cause the output to be regulated at an artificially high value (exceeding the 3.3 V output) and potentially damaging the load circuitry. The soft-start circuitry forces regulator 200 to operate at a reduced duty-cycle until the output capacitors are adequately charged and normal operation may occur. Although a specific soft-start circuit is shown in FIG. 3, persons skilled in the art will recognize that various other circuit configurations may be used to mitigate start-up overshoot.

The regulator circuit of FIG. 3 can be implemented using commercially available components. For example, the circuit can be constructed and operated using the following components and values:

TABLE 1

| | |
|---|---|
| P-Channel FET: Switches 202 & 203 | Si9435DY (available from Siliconix of Santa Clara, California) |
| N-Channel FET: Switches 204 & 203 | Si9435DY (available from Siliconix of Santa Clara, California) |
| Transformer T1: (Windings 206 & 216) | HL-8700 (available from Hurricane Electronics Lab of Hurricane, Utah) |
| Capacitors 222,: 224, 226 & 228 | 22 microfarads |
| Capacitors 230, 232: 234, 236, 238 & 240 | 220 microfarads |
| Capacitor 242: | 0.047 microfarads |
| Capacitor 244: | 0.068 microfarads |
| Capacitor 246: | 2.2 microfarads |
| Capacitor 248: | 1000 picofarads |
| Capacitor 252: | 2200 picofarads |
| Resistor 254: | 1K ohms |
| Resistor 256: | 24.9K ohms (1% metal film) |
| Capacitor 258: | 56 picofarads |
| Resistors 260 & 262: | 100 ohms |
| Capacitor 264: | 1000 picofarads |
| Resistor 266: | 0.02 ohms |
| Capacitor 268: | 1 microfarad |
| Diodes 270, 276,: 282 and 284 | BAS16 (available from Philips Components, Discrete Seimiconductor Group of Slatersville, Rhode Island) |

TABLE 1-continued

| Resistor 272: | 33K ohms |
|---|---|
| Capacitor 274: | 0.1 microfarads |
| Diodes 278 & 280: | MBRS140 (available from Motorola Semiconductor Products, Inc. of Phoenix, Arizona) |
| Capacitor 286: | 10 microfarads |
| Resistor 288: | 102K ohms |
| Resistor 290: | 124K ohms |

Figure 4:
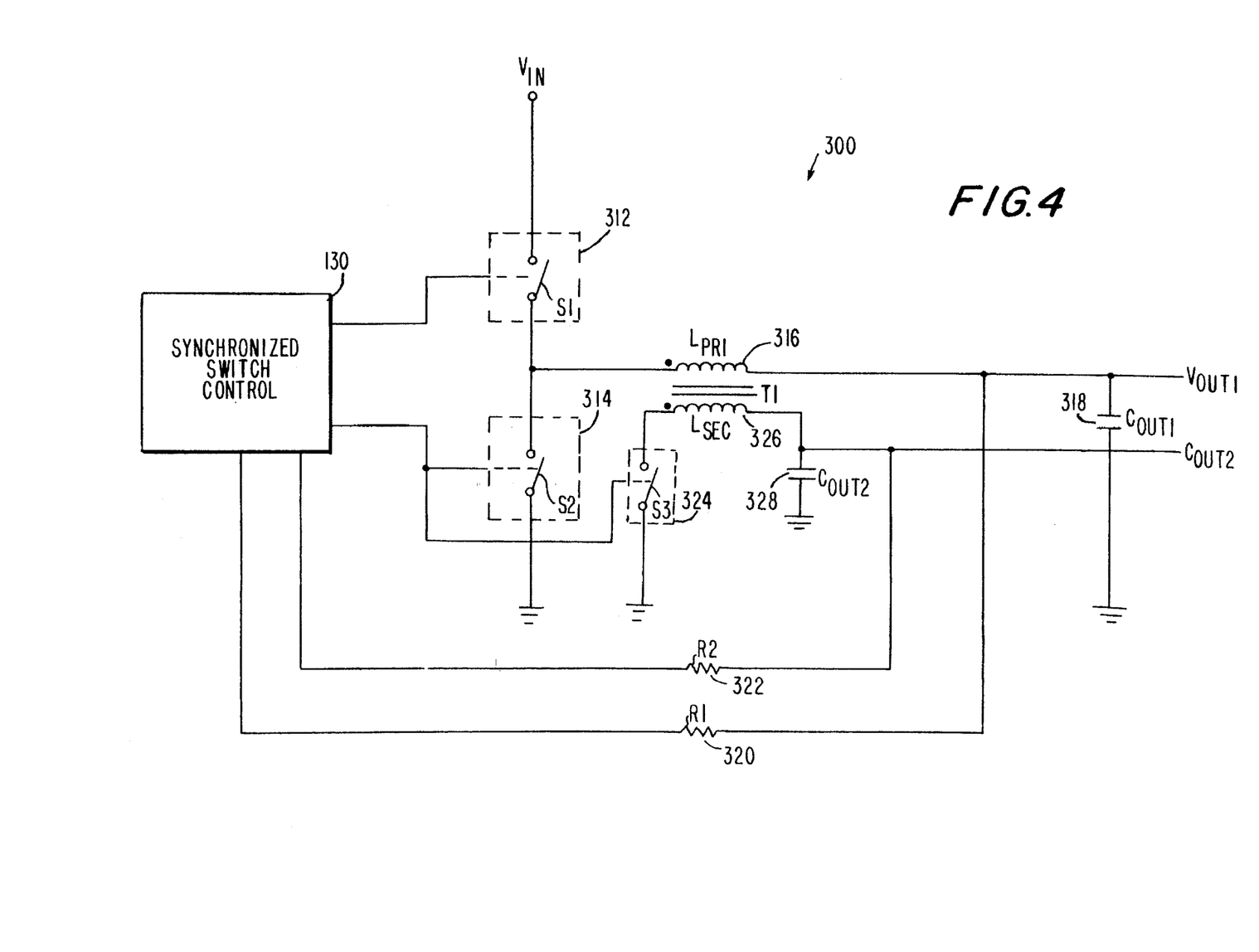
FIG. 4 is a block schematic diagram of an embodiment of a multiple output buck-flyback switching voltage regulator having electrically independent outputs in which synchronous switching is provided for each output in accordance with principles of the present invention.

FIG. 4 shows a block and circuit diagram of another embodiment of a multiple output synchronous switching regulator 300 which incorporates principles of the present invention. Switching regulator 300 differs from switching regulator 110 (in FIG. 2) in that the outputs of circuit 300 are essentially electrically independent of one another (although they are still magnetically coupled). As in the previously described switching regulators of the present invention, switching regulator 300 includes a switch 312 (S1), coupled in series with a primary winding 316 ($L_{PRI}$) of transformer T1 that is coupled between $V_{IN}$ and $V_{OUT1}$. It should be noted that $V_{IN}$ may also be used to supply power to a switch control circuit 130, or switch control 130 may be independently powered. This provides additional flexibility to the overall circuit in that $V_{IN}$ may be positive or negative, as dictated by individual circumstances. The main output ($V_{OUT1}$) also includes a second switch 314 (S2) which is coupled between ground and a node between switch 312 and primary winding 316, and an output capacitor 318 ($C_{OUT1}$) which is coupled between ground and $V_{OUT1}$. Feedback is provided to switch control 130 through a sensing resistor 320 (R1).

The second output ($V_{OUT2}$) of switching regulator 300, while being electrically isolated from the main output, is magnetically coupled to the main output via a secondary winding 326 ($L_{SEC}$) of transformer T1 which is wound on the same core as primary winding 316. A switch 324 (S3) is coupled between one end of secondary winding 326 and ground, while the other end of secondary 326 provides output signal $V_{OUT2}$. An output capacitor 328 ($C_{OUT2}$) is coupled between $V_{OUT2}$ and ground, and feedback is provided to switch control 130 through a sensing resistor 322 (R2).

The overall operation of switching regulator 300 is essentially the same as described previously regarding switching regulator 110. When switch S1 is closed, current flows into the primary winding to increase the energy stored in the winding (and the output capacitor). When S1 is opened and switches S2 and S3 are closed, the primary winding discharges (through the path through switch S2 to ground) and a voltage appears across the secondary winding (because the voltage across the primary is fixed) which charges capacitor $C_{OUT2}$. The cycle reverses when the switches are switched again, but in this case, the regulated outputs are completely independent from each other.

The duty-cycle of switches S1, S2 and S3 in each embodiment are all synchronously controlled by the switch control in a manner whereby switches S2 and S3 are operated substantially in phase with each other, and substantially in anti-phase with switch S1. Although a goal of the regulator circuits is essentially 180° anti-phase operation of the switches (as described), increased efficiency, albeit reduced, is still obtained at less than 180° anti-phase operation. In this configuration, as discussed, outputs $V_{OUT1}$ and $V_{OUT2}$ are essentially electrically isolated from each other. Additionally, the feedback signals from each of the outputs may be combined to form a single feedback signal (either within the switch control or outside of it) having components representative of both output signals.

Although preferred embodiments of the inventions have been disclosed, with various components connected to other components, persons skilled in the art will appreciate that it may not be necessary for such connections to be direct and additional components may be interconnected between the shown connected components without departing from the spirit of the invention as shown. Persons skilled in the art will appreciate also that the present invention can be practiced by other than the described embodiments. The described embodiments are presented for purposes of illustration and not of limitation, and the present invention is limited only by the claims which follow.

What is claimed is:

1. A circuit for providing a plurality of regulated output voltages, said circuit comprising:

first and second switches coupled in series between a source of electrical potential;

a first inductive element having a first end coupled to a node between said first and second switches, and a second end coupled to produce a first output;

a second inductive element having a first end coupled to produce a second output, and magnetically coupled with said first inductive element;

a third switch coupled in series with said second inductive element to turn current flow through said second inductive element ON and OFF; and a control circuit coupled to synchronously control the ON and OFF duty cycles of said first, second and third switches to regulate said first and second outputs, such that said second and third switches operate in substantial phase with one another, and in substantial anti-phase with said first switch.

2. The circuit of claim 1, wherein said control circuit further includes:

a first feedback circuit coupled to provide a first feedback signal indicative of the magnitude of said first output;

a second feedback circuit coupled to provide a second feedback signal indicative of the magnitude of said second output, wherein said first and second feedback signals are coupled to said control circuit to responsively vary the ON and OFF duty cycles of said switches.

3. The circuit of claim 1, wherein said control circuit further includes:

a first feedback circuit coupled to provide a first feedback signal indicative of the magnitude of said first output;

a second feedback circuit coupled to provide a second feedback signal indicative of the magnitude of said second output, wherein said first and second feedback signals are combined into a single feedback signal which is coupled to said control circuit to responsively vary the ON and OFF duty cycles of said switches.

4. The circuit of claim 1, wherein said source of electrical potential is between a positive supply voltage and ground.

5. The circuit of claim 1, wherein said source of electrical potential is between a positive supply voltage and a negative supply voltage.

6. The circuit of claim 1, wherein said source of electrical potential is between ground and a negative supply voltage.

7. The circuit of claim 1, wherein said source of electrical potential is between two different supply voltages of like polarity.

8. The circuit of claim 1, wherein said first output is produced at a first output terminal, said second output is produced at a second output terminal and said source of electrical potential is across first and second input terminals.

9. The circuit of claim 8, wherein said third switch is coupled between said first and second inductive elements.

10. The circuit of claim 8, wherein said third switch is coupled between said second inductive element and said second output terminal.

11. The circuit of claim 8, wherein said third switch is coupled between said second inductive element and said second input terminal.

12. The circuit of claim 8 further comprising:
 a first output capacitor coupled to said first output terminal; and
 a second output capacitor coupled to said second output terminal.

13. The circuit of claim 12, wherein said second output capacitor is coupled between said first and second output terminals.

14. A circuit for providing a plurality of regulated output voltages, said circuit comprising:
 first and second switches coupled in series between a source of electrical potential;
 a first inductive element having a first end coupled to a node between said first and second switches, and a second end coupled to produce a first output;
 a second inductive element having a first end coupled to produce a second output, and magnetically coupled with said first inductive element;
 a third switch coupled in series with said second inductive element to turn current flow through said second inductive element ON and OFF;
 a control circuit coupled to synchronously control the ON and OFF duty cycles of said first, second and third switches such that said second and third switches operate in substantial phase with one another, and in substantial anti-phase with said first switch; and
 a circuit for sensing said first and second outputs, for producing feedback signals indicative of the magnitudes of said first and second outputs, and for coupling said feedback signals to said control circuit to regulate said first and second outputs.

15. The circuit of claim 14, wherein said feedback signals are combined into a single feedback signal that is coupled to said control circuit.

16. The circuit of claim 14, wherein said source of electrical potential is between a positive supply voltage and ground.

17. The circuit of claim 14, wherein said first output is produced at a first output terminal, said second output is produced at a second output terminal and said source of electrical potential is across first and second input terminals.

18. The circuit of claim 17, wherein said third switch is coupled between said first and second inductive elements.

19. The circuit of claim 17, wherein said third switch is coupled between said second inductive element and said second output terminal.

20. The circuit of claim 17, wherein said third switch is coupled between said second inductive element and said second input terminal.

21. The circuit of claim 17 further comprising:
 a first output capacitor coupled to said first output terminal; and
 a second output capacitor coupled to said second output terminal.

22. The circuit of claim 21, wherein said second output capacitor is coupled between said first and second output terminals.

23. A circuit for regulating a plurality of output voltages, said circuit comprising:
 first and second means, coupled in series with each other across a source of electrical potential, for turning a first current ON and OFF;
 a first inductive means coupled to a node between said first and second means, and coupled to produce a first output;
 a second inductive means coupled to produce a second output, and magnetically coupled with said first inductive means;
 a third means, coupled in series with said second inductive means, for turning a second current through said second inductive means ON and OFF; and
 means for synchronously controlling the ON and OFF duty cycles of said first, second and third means such that said second and third means operate in substantial phase with one another, and in substantial anti-phase with said first means, to cause said first and second outputs to be regulated.

24. The circuit of claim 23 further comprising:
 first and second feedback means coupled to provide feedback signals indicative of the magnitude of said first and second outputs, respectively, wherein said feedback signals are coupled to said means for controlling to responsively vary the ON and OFF duty cycles of said first, second and third means.

25. The circuit of claim 24, wherein said feedback signals are combined into a single feedback signal that is coupled to said means for controlling.

26. The circuit of claim 23, wherein said source of electrical potential is between a positive supply voltage and ground.

27. The circuit of claim 23, wherein said first output is produced at a first output terminal, said second output is produced at a second output terminal and said source of electrical potential is across first and second input terminals.

28. The circuit of claim 27, wherein said third means is coupled between said first and second inductive means.

29. The circuit of claim 27, wherein said third means is coupled between said second inductive means and said second output terminal.

30. The circuit of claim 27, wherein said third means is coupled between said second inductive means and said second input terminal.

31. The circuit of claim 27 further comprising:
 first and second output capacitors coupled to said first and second output terminals, respectively.

32. The circuit of claim 31, wherein said second output capacitor is coupled between said first and second output terminals.

33. In a circuit adapted to be coupled to first and second terminals providing a source of electrical potential, a method for producing regulated first and second output voltages comprising the steps of:
 forming a current path between said first terminal and said first output through a first switch and a first inductive element;
 forming a current path between said second terminal and said first output through a second switch and said first inductive element;
 forming a current path between said second terminal and said second output through a third switch and a second inductive element, wherein said third switch turns current flow through said second inductive element ON and OFF;

magnetically coupling said first and second inductive elements; and synchronously controlling the ON and OFF duty cycles of said first, second and third switches such that said second and third switches are operated in substantial phase with one another, and in substantial anti-phase with said first switch, to cause said first and second outputs to be regulated.

34. The method of claim 33 further comprising the step of:

providing first and second feedback signals indicative of said first and second outputs, respectively, to responsively vary the ON and OFF duty cycles of said switches.

35. The method of claim 34 further comprising the steps of:

combining said first and second feedback signals into a single feedback signal; and coupling said single feedback signal such that said step of controlling responsively varies the ON and OFF duty cycles of said switches, at least in part, based on said single feedback signal.

36. The method of claim 33 further comprising the step of:

charging and discharging first and second output capacitors coupled to said first and second outputs, respectively.

37. The method of claim 36, wherein said second output capacitor is coupled between said first and second outputs.

38. In a circuit adapted to be coupled to first and second terminals providing a source of electrical potential, a method for producing regulated first and second output voltages comprising the steps of:

forming a current path between said first terminal and said first output through a first switch and a first inductive element;

forming a current path between said second terminal and said first output through a second switch and said first inductive element;

forming a current path between said second terminal and said second output through a third switch and a second inductive element, wherein said third switch turns current flow through said second inductive element ON and OFF;

magnetically coupling said first and second inductive elements; and synchronously controlling the ON and OFF duty cycles of said first, second and third switches to cause said first and second outputs to be regulated.

39. The method of claim 38 further comprising the step of:

providing first and second feedback signals indicative of said first and second outputs, respectively, to responsively vary the ON and OFF duty cycles of said switches.

40. The method of claim 39 further comprising the steps of:

combining said first and second feedback signals into a single feedback signal; and coupling said single feedback signal such that said step of controlling responsively varies the ON and OFF duty cycles of said switches, at least in part, based on said single feedback signal.

41. The method of claim 38 further comprising the step of:

charging and discharging first and second output capacitors coupled to said first and second outputs, respectively.

42. The method of claim 41, wherein said second output capacitor is coupled between said first and second outputs.

43. A circuit for providing first and second regulated output voltages, said circuit comprising:

first and second switches coupled in series between a source of electrical potential;

a first inductive element coupled at a first end to a node between said first and second switches, and coupled at a second end to produce said first output;

a second inductive element coupled at a first end to produce said second output, and magnetically coupled with said first inductive element;

a third switch coupled in series with said second inductive element to turn current flow through said second inductive element ON and OFF; and means for synchronously controlling the ON and OFF duty cycles of said first, second and third switches to cause said first and second outputs to be regulated.

44. The circuit of claim 43, wherein said means for controlling controls said the ON and OFF duty cycles of said first, second and third switches to regulate said outputs, such that said second and third switches operate in substantial phase with one another, and in substantial anti-phase with said first switch.

45. The circuit of claim 43 further comprising:

first and second feedback circuits coupled to produce feedback signals indicative of said first and second outputs, respectively, to responsively vary the ON and OFF duty cycles of said switches.

46. The circuit of claim 45, wherein said feedback signals are combined into a single feedback signal that is coupled to said means for controlling.

47. A circuit for providing a plurality of regulated output voltages, said circuit comprising:

a first switching voltage regulator circuit in a buck configuration providing a buck regulated output, said first regulator circuit being synchronously controlled by first and second switches;

a second switching voltage regulator circuit in a flyback configuration providing a flyback regulated output, said second regulator circuit being synchronously controlled by said first switch and a third switch, and said regulator circuits being magnetically coupled;

means for synchronously controlling the ON and OFF duty cycles of said first, second and third switches to cause said buck and flyback outputs to be simultaneously regulated.

48. The circuit of claim 47 further comprising first and second feedback circuits for providing first and second feedback signals indicative of said first and second outputs, respectively, to responsively vary the ON and OFF duty cycles of said switches.

49. The circuit of claim 48, wherein said feedback signals are combined into a single feedback signal which is coupled to said means for controlling.

50. The circuit of claim 47 further comprising:

first and second output capacitors coupled to said buck and flyback outputs, respectively.

51. The circuit of claim 50, wherein said second output capacitor is coupled between said buck and flyback outputs.

52. The circuit of claim 47, wherein said first and second regulator circuits are electrically coupled.

53. In a circuit adapted to be coupled to first and second terminals providing a source of electrical potential, a method of producing synchronously regulated buck and flyback output voltages comprising the steps of:

forming a current path between said first terminal and said buck output through a first switch and a first inductive element;

forming a current path between said second terminal and said buck output through a second switch and said first inductive element;

forming a current path through a second inductive element and a third switch to said flyback output;

magnetically coupling said buck and flyback outputs; and synchronously controlling the ON and OFF duty cycles of said first, second and third switches such that said first and second switches operate in substantial anti-phase with one another to generate said buck output and said first and third switches operate in substantial anti-phase with one another to generate said flyback output.

54. The method of claim 53 further comprising the step of:

providing buck and flyback feedback signals indicative of said buck and flyback outputs to responsively vary the ON and OFF duty cycles of said switches.

55. The method of claim 54 further comprising the steps of:

combining said buck and flyback feedback signals into a single feedback signal; and coupling said single feedback signal such that said step of controlling responsively varies the ON and OFF duty cycles of said switches, at least in part, based on said single feedback signal.

56. The method of claim 53 further comprising the step of:

charging and discharging first and second output capacitors coupled to said buck and flyback outputs, respectively.

57. The method of claim 56, wherein said second output capacitor is coupled between said buck and flyback outputs.

58. A circuit for providing a plurality of regulated output voltages, said circuit comprising:

first and second switches coupled in series between a source of electrical potential;

a first inductive element having a first end coupled to a node between said first and second switches, and a second end coupled to produce a first output;

a second inductive element having a first end coupled to produce a second output, and magnetically coupled with said first inductive element;

a third switch coupled in series with said second inductive element to control current flow through said second inductive element;

a control circuit coupled to synchronously control the ON and OFF duty cycles of said first, second and third switches to regulate said first and second outputs, such that said second and third switches operate in substantial phase with one another, and in substantial anti-phase with said first switch;

a first feedback circuit coupled to provide a first feedback signal indicative of the magnitude of said first output; and a second feedback circuit coupled to provide a second feedback signal indicative of the magnitude of said second output, wherein said first and second feedback signals are combined into a single feedback signal which is coupled to said control circuit to responsively vary the ON and OFF duty cycles of said switches.

59. A circuit for providing a plurality of regulated output voltages, said circuit comprising:

first and second switches coupled in series between a source of electrical potential;

a first inductive element having a first end coupled to a node between said first and second switches, and a second end coupled to produce a first output;

a second inductive element having a first end coupled to produce a second output, and magnetically coupled with said first inductive element;

a third switch coupled in series with said second inductive element to control current flow through said second inductive element;

a control circuit coupled to synchronously control the ON and OFF duty cycles of said first, second and third switches such that said second and third switches operate in substantial phase with one another, and in substantial anti-phase with said first switch; and a circuit for sensing said first and second outputs, for producing feedback signals indicative of the magnitudes of said first and second outputs, and for coupling said feedback signals to said control circuit to regulate said first and second outputs, wherein said feedback signals are combined into a single feedback signal that is coupled to said control circuit.

60. In a circuit adapted to be coupled to first and second terminals providing a source of electrical potential, a method for producing regulated first and second output voltages comprising the steps of:

forming a current path between said first terminal and said first output through a first switch and a first inductive element;

forming a current path between said second terminal and said first output through a second switch and said first inductive element;

forming a current path between said second terminal and said second output through a third switch and a second inductive element, wherein said third switch controls current flow through said second inductive element;

magnetically coupling said first and second inductive elements;

synchronously controlling the ON and OFF duty cycles of said first, second and third switches such that said second and third switches are operated in substantial phase with one another, and in substantial anti-phase with said first switch, to cause said first and second outputs to be regulated;

providing first and second feedback signals indicative of said first and second outputs, respectively, to responsively vary the ON and OFF duty cycles of said switches;

combining said first and second feedback signals into a single feedback signal; and coupling said single feedback signal such that said step of controlling responsively varies the ON and OFF duty cycles of said switches, at least in part, based on said single feedback signal.

61. In a circuit adapted to be coupled to first and second terminals providing a source of electrical potential, a method for producing regulated first and second output voltages comprising the steps of:

forming a current path between said first terminal and said first output through a first switch and a first inductive element;

forming a current path between said second terminal and said first output through a second switch and said first inductive element;

forming a current path between said second terminal and said second output through a third switch and a second inductive element, wherein said third switch controls current flow through said second inductive element;

magnetically coupling said first and second inductive elements; and synchronously controlling the ON and OFF duty cycles of said first, second and third switches to cause said first and second outputs to be regulated;

providing first and second feedback signals indicative of said first and second outputs, respectively, to responsively vary the ON and OFF duty cycles of said switches;

combining said first and second feedback signals into a single feedback signal; and coupling said single feedback signal such that said step of controlling responsively varies the ON and OFF duty cycles of said switches, at least in part, based on said single feedback signal.

62. A circuit for providing first and second regulated output voltages, said circuit comprising:

first and second switches coupled in series between a source of electrical potential;

a first inductive element coupled at a first end to a node between said first and second switches, and coupled at a second end to produce said first output;

a second inductive element coupled at a first end to produce said second output, and magnetically coupled with said first inductive element;

a third switch coupled in series with said second inductive element to control current flow through said second inductive element;

means for synchronously controlling the ON and OFF duty cycles of said first, second and third switches to cause said first and second outputs to be regulated; and first and second feedback circuits coupled to produce feedback signals indicative of said first and second outputs, respectively, to responsively vary the ON and OFF duty cycles of said switches, wherein said feedback signals are combined into a single feedback signal that is coupled to said means for controlling.

* * * * *